United States Patent
Lee et al.

(10) Patent No.: US 9,237,212 B2
(45) Date of Patent: Jan. 12, 2016

(54) LOCKING DEVICE FOR SLIDING/SWING TYPE MOBILE TERMINAL

(75) Inventors: Dong-Yup Lee, Gumi-si (KR); Sung-Sun Park, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1007 days.

(21) Appl. No.: 11/856,882

(22) Filed: Sep. 18, 2007

(65) Prior Publication Data

US 2008/0250826 A1  Oct. 16, 2008

(30) Foreign Application Priority Data

Apr. 10, 2007  (KR) .................. 10-2007-0035158

(51) Int. Cl.
*H04M 1/02* (2006.01)

(52) U.S. Cl.
CPC .......... *H04M 1/0233* (2013.01); *H04M 1/0237* (2013.01); *Y10T 70/5009* (2015.04)

(58) Field of Classification Search
USPC ............ 455/550.1, 575.1, 575.4; 379/433.12, 379/433.13
See application file for complete search history.

(56) References Cited

U.S. PATENT DOCUMENTS

| | | | |
|---|---|---|---|
| 7,376,450 B2* | 5/2008 | Chen ......................... 455/575.4 |
| 7,492,893 B2* | 2/2009 | Ahn et al. ................ 379/433.13 |
| 7,496,389 B2* | 2/2009 | Cho et al. .................. 455/575.4 |
| 7,529,571 B2* | 5/2009 | Byun et al. ................. 455/575.4 |
| 7,564,691 B2* | 7/2009 | Kuwajima et al. ............ 361/728 |
| 7,577,466 B2* | 8/2009 | Kim .......................... 455/575.4 |
| 2006/0030381 A1* | 2/2006 | Byun et al. ................. 455/575.4 |
| 2006/0060737 A1* | 3/2006 | Jeun ......................... 248/289.11 |
| 2006/0142073 A1* | 6/2006 | Gordecki .................... 455/575.4 |
| 2006/0211460 A1* | 9/2006 | Jeong et al. ................ 455/575.4 |
| 2007/0293283 A1* | 12/2007 | Inubushi et al. ........... 455/575.1 |
| 2008/0004083 A1* | 1/2008 | Ohki et al. .................... 455/566 |

FOREIGN PATENT DOCUMENTS

KR  10-2006-0025744 A   3/2006
KR     10-0691778 B1     2/2007

* cited by examiner

*Primary Examiner* — Junpeng Chen
(74) *Attorney, Agent, or Firm* — Jefferson IP Law, LLP

(57) ABSTRACT

A locking device for a sliding/swing type mobile terminal is provided. The terminal includes a body housing and a sliding housing which slides on the body housing and swinging to open and close. The locking device includes a sliding member connected to the sliding housing while enabling the sliding housing to slide, a swing member which assembles the sliding member while enabling the sliding member to swing, and a locking unit which includes the sliding member and the swing member, the locking unit which prevents the sliding housing from swinging while sliding and from sliding while swinging in a state before sliding.

18 Claims, 18 Drawing Sheets

LOCKING DEVICE FOR SLIDING/SWING TYPE MOBILE TERMINAL

PRIORITY

This application claims the benefit under 35 U.S.C. §119 (a) of a Korean patent application filed in the Korean Industrial Property Office on Apr. 10, 2007 and assigned Serial No. 2007-35158, the entire disclosure of which is hereby incorporated by reference.

BACKGROUND OF THE INVENTION

1. Field of the Invention:

The present invention relates to a digital mobile terminal, including a cellular phone, a Personal Digital Assistant (PDA), a Hand Held Phone (HHP), an MP3 phone, a game phone, a camera phone, an Internet phone or a communication device combining one or more of such phones. More particularly, the present invention relates to a locking device for a sliding/swing type mobile terminal, which prevents the terminal from swinging while sliding and from sliding while swinging.

2. Description of the Related Art:

The term "mobile terminals" refers to handheld devices used for data transmissions or wireless communications while moving. It is a current trend that mobile terminals are becoming smaller, sleeker and lighter to improve portability and are implementing various multimedia functions and services. Particularly, mobile terminals are changing to become multifunctional, multipurpose and multimedia devices, and are expected to be modified to meet various multimedia and Internet environments. With such trends, mobile terminals have quickly attained worldwide popularity as a necessity for people of all ages.

Generally, mobile terminals are classified into different types, such as a bar type, a flip type and a folder type, according to their outward appearances. Also, depending on where and how a user puts the terminal on, mobile terminals can be classified into a neck wearable type or a wrist type. Such various types of mobile terminals are obvious to those having ordinary skill in the art.

Mobile terminals have gone beyond merely being telephones for voice communication and are becoming more integrated to perform high-speed data transmission. In other words, mobile terminals are changing to offer high-speed data transmission services by using wireless communication technologies to meet the increasing demand of users.

Mobile terminals equipped with a camera can send image signals to another terminal. Conventional mobile terminals generally include an external type or internal type camera lens module to take pictures or to offer video conferencing.

In a conventional mobile terminal, it is uncomfortable to watch videos and TV through its display device because a TV mode and video mode require a wider range display screen than when information is displayed. Therefore, sliding/swing type mobile terminals have been developed, which have a display device capable of swinging after sliding.

One example of a conventional sliding/swing type mobile terminal is disclosed in a Korean patent No. 0681068 in greater detail, which patent is owned by the applicant, and which is hereby incorporated by reference.

A sliding/swing device of the Korean patent No. 0681068 includes a body housing, a sliding housing which swings after sliding while being in facing contact with the body housing, first and second hinge frames, first and second plates, a slide bar, and a connecting unit.

However, the sliding/swing device for the mobile terminal above has a configuration in which the sliding housing can be swung only after sliding from the body housing but can not be swung before sliding. Therefore, it is uncomfortable that the sliding housing must be swung after sliding if the user needs to use the display device widely. In addition, it is a disadvantage that the sliding housing swings regardless of the user's intention after having been slid.

SUMMARY OF THE INVENTION

An aspect of the present invention is to address the above-mentioned problems and/or disadvantages and to provide at least the advantages described below. Accordingly, an aspect of the present invention is to provide a sliding/swing device for a mobile terminal, in which a swing movement of the sliding housing is prevented when sliding and a sliding movement of the sliding housing is prevented when swinging, thereby making the sliding/swing movement easy and providing improved functions of the sliding or swing locking of the terminal.

In accordance with an aspect of the present invention, a locking device for a sliding/swing type mobile terminal is provided. The locking device includes a body housing and a sliding housing. The sliding housing slides on the body housing and swings to open and close. The locking device includes a sliding member connected to the sliding housing while enabling the sliding housing to slide, a swing member which assembles the sliding member while enabling the sliding member to swing, and a locking unit which includes the sliding member and the swing member. The locking unit prevents the sliding housing from swinging while sliding and from sliding while swinging in a state before sliding.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
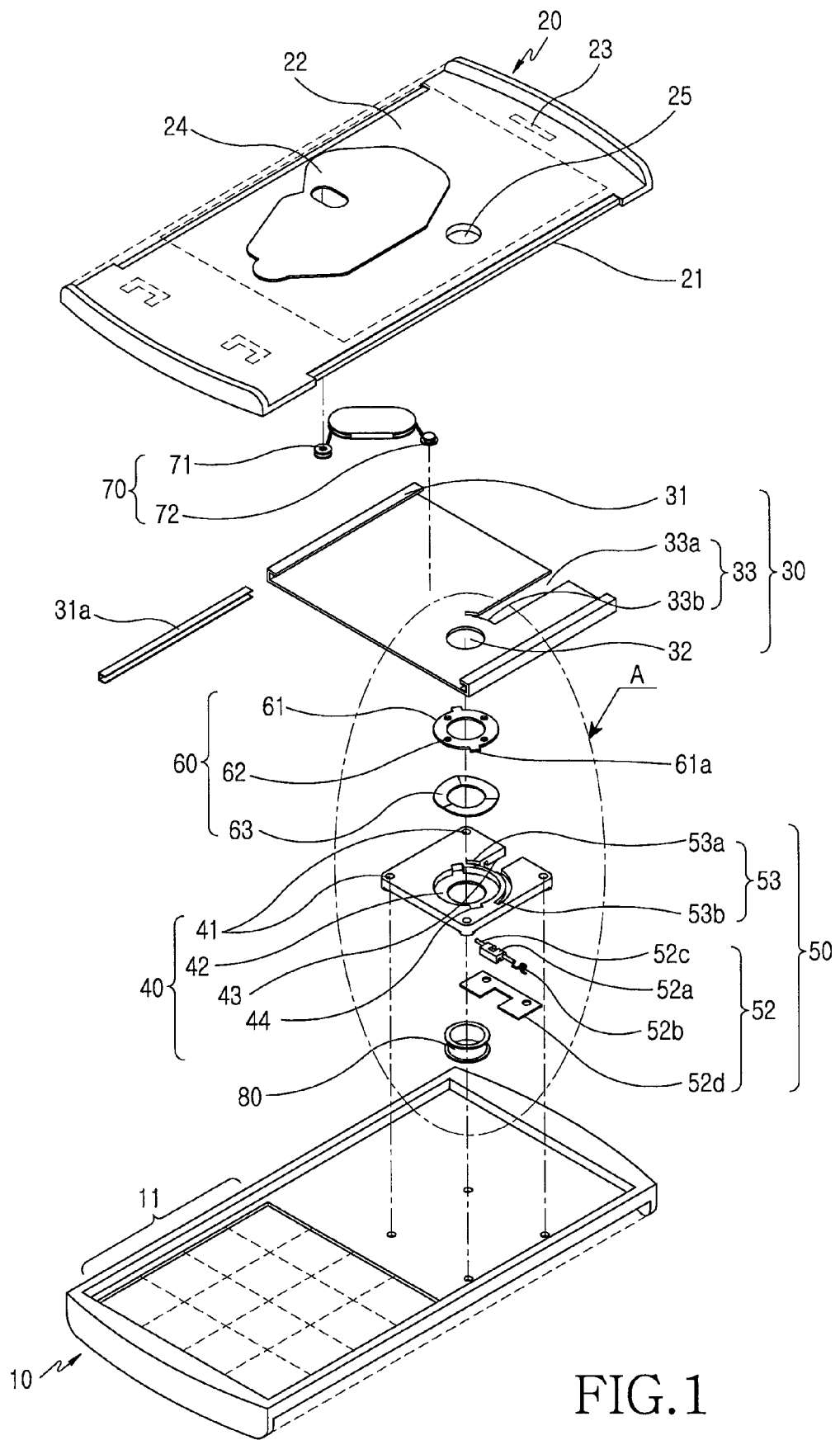
FIG. 1 is an exploded perspective view illustrating a locking device for a sliding/swing type mobile terminal according to an exemplary embodiment of the present invention.
Figure 2:
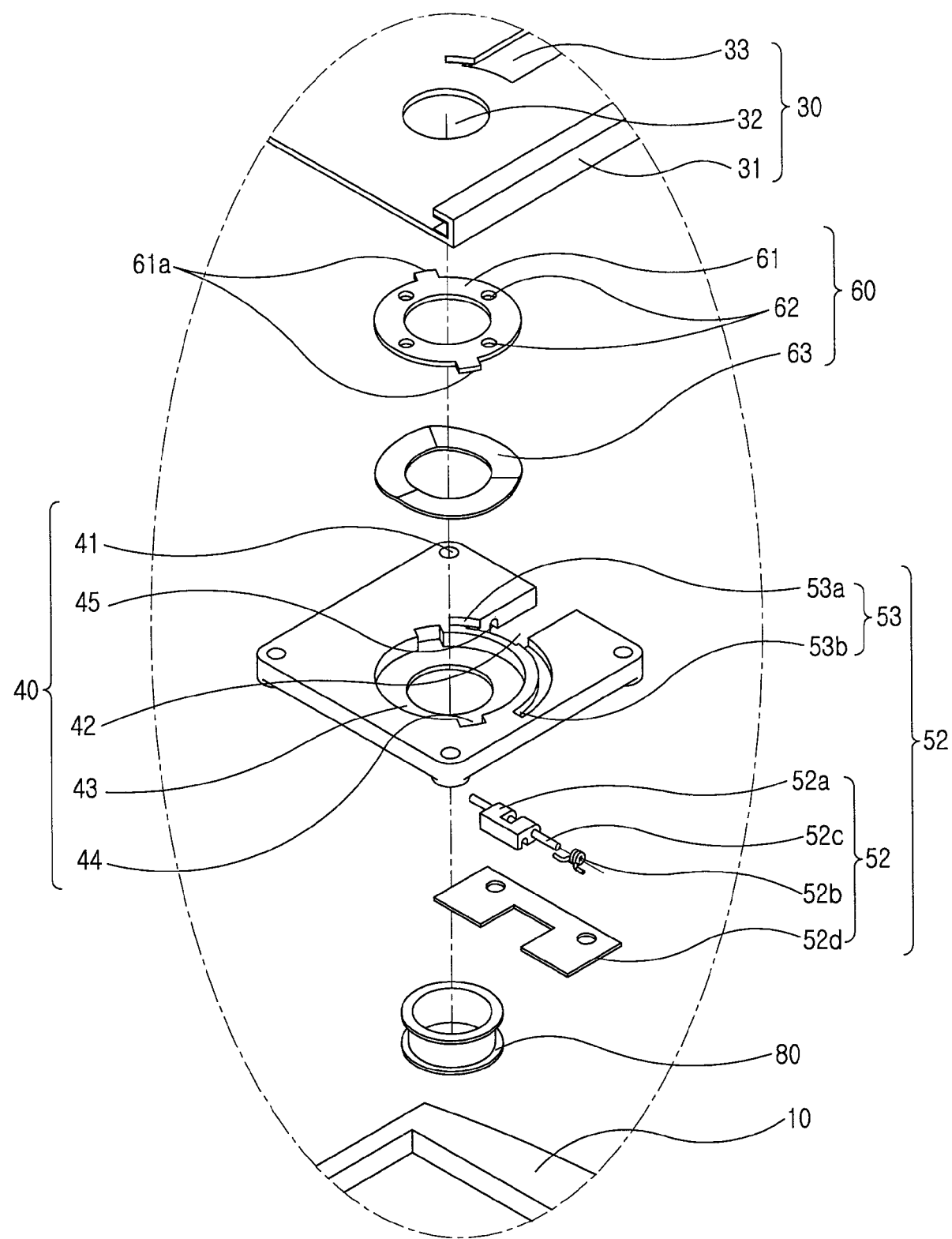
FIG. 2 is an enlarged exploded perspective view of "A" of FIG. 1.

As shown in FIGS. 1 and 2, a locking device for a sliding/swing type mobile terminal includes a body housing 10, a sliding housing 20, a sliding member 30, a swing member 40, and a locking unit 50. A keypad 11 includes an array of a plurality of keys and a microphone unit (not shown) in the body housing 10. The sliding housing 20 includes a display device 22 and a speaker unit 23. In an exemplary embodiment, the display device 22 includes a liquid crystal display. The sliding member 30 is connected to the sliding housing 20 in a manner permitting the sliding housing 20 to slide. The swing member 40 is connected to the body housing 10 and the sliding member 30 in a manner permitting the sliding member 30 to swing. The locking unit 50 is disposed in the sliding member 30 and the swing member 40 together, so that the locking unit 50 prevents the sliding housing 20 from swinging when the sliding housing 20 slides and from sliding when the sliding housing 20 swings before sliding.

Figure 5:
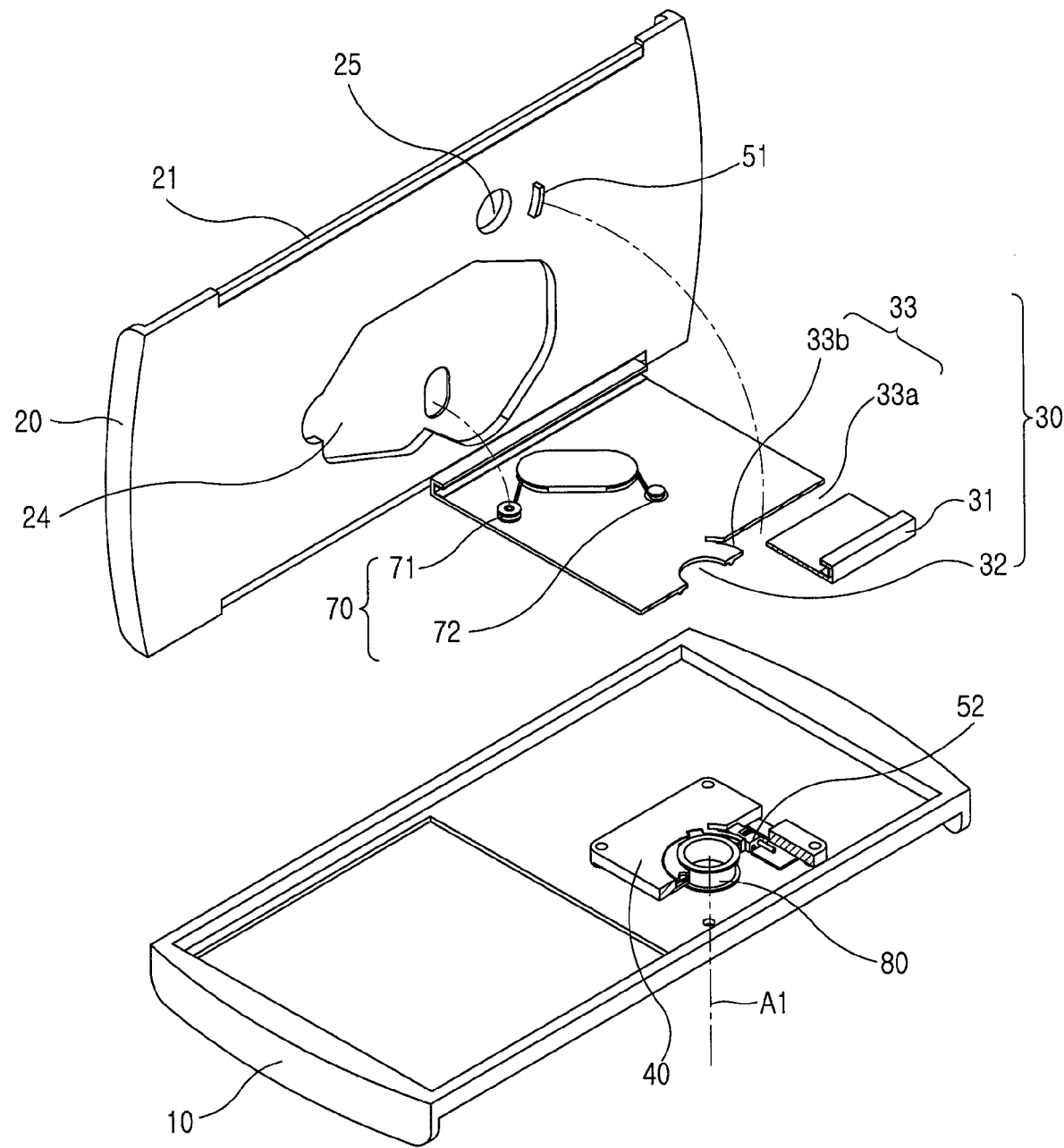
FIG. 5 is an exploded perspective view illustrating a locking device for a sliding/swing type mobile terminal according to an exemplary embodiment of the present invention, which shows a sliding member in a state before being assembled.

As shown in FIGS. 1 and 5, the sliding member 30 includes a pair of guide ribs 31, a connecting hole 32, and a guide insertion section 33. Each of the guide ribs 31 is disposed at each of both sides of the sliding member 30 so as to movably connect with and guide each of guide rails 21 disposed in the sliding housing 20. The connecting hole 32 is aligned with a hinge axis A1 described below. The connecting hole 32 is eccentrically located with respect to the center of the sliding member 30 so as to place the center of the sliding housing 20 on an upper portion of the body housing 10 when the sliding housing 20 has swung. The guide insertion section 33 is disposed in a sliding direction of the sliding housing 20 and adjacent to the connecting hole 32 so as to receive a locker 51 to be inserted therein and guide a movement of the locker 51.

As shown in FIG. 1, each of the guide rails 21 has each of friction reducing members 31a disposed therein, thereby reducing a friction caused when the guide rails 21 slide on the guide ribs 31.

As shown in FIGS. 1 and 5, the guide insertion section 33 has one end 33a opened to form an entrance through which the locker 51 is inserted therein and escaped therefrom and the other end closed to prevent the locker 51 from moving.

Figure 3:
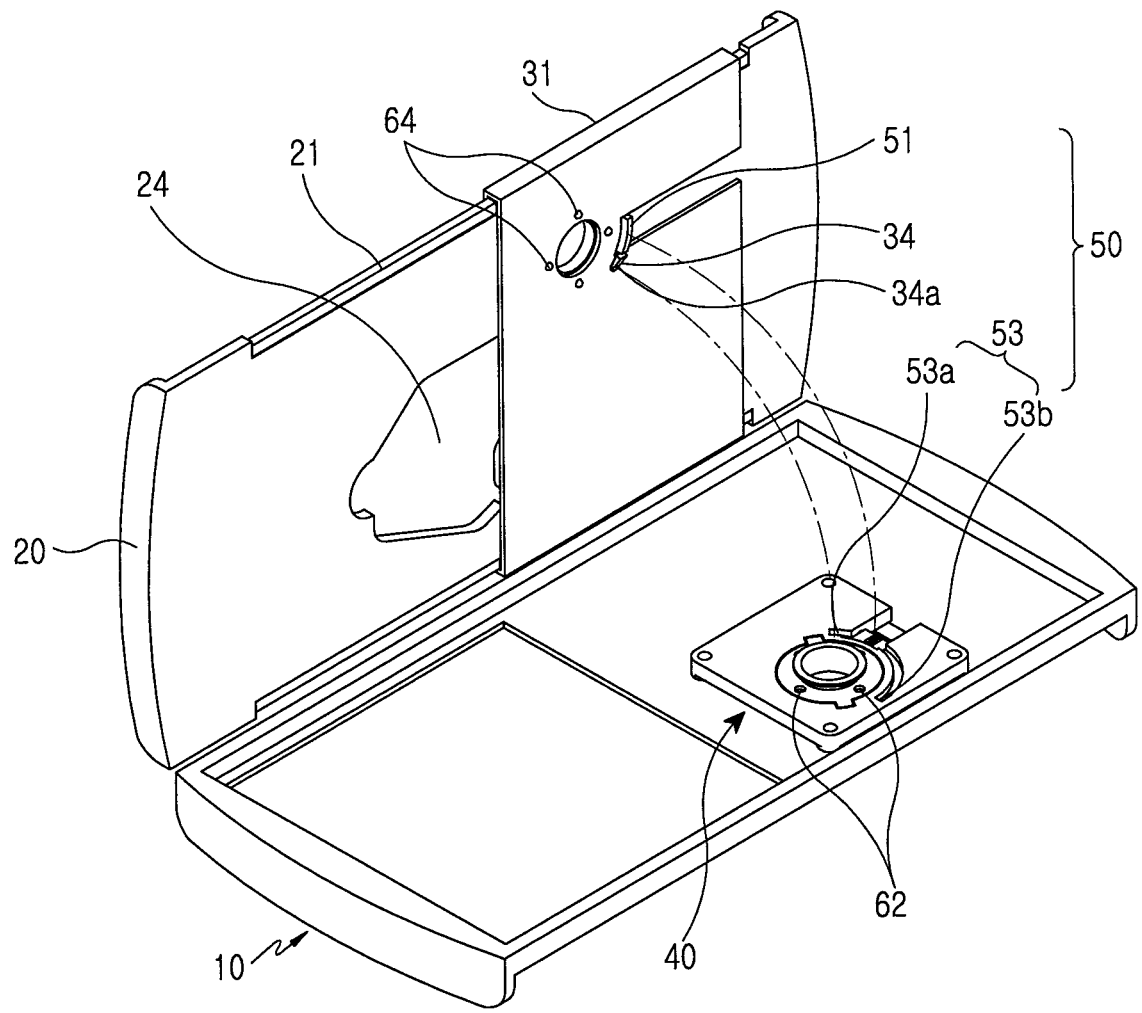
FIG. 3 is an exploded perspective view illustrating a locking device for a sliding/swing type mobile terminal according to an exemplary embodiment of the present invention, which shows a sliding member and a swing member in a state before assembled.
Figure 4:
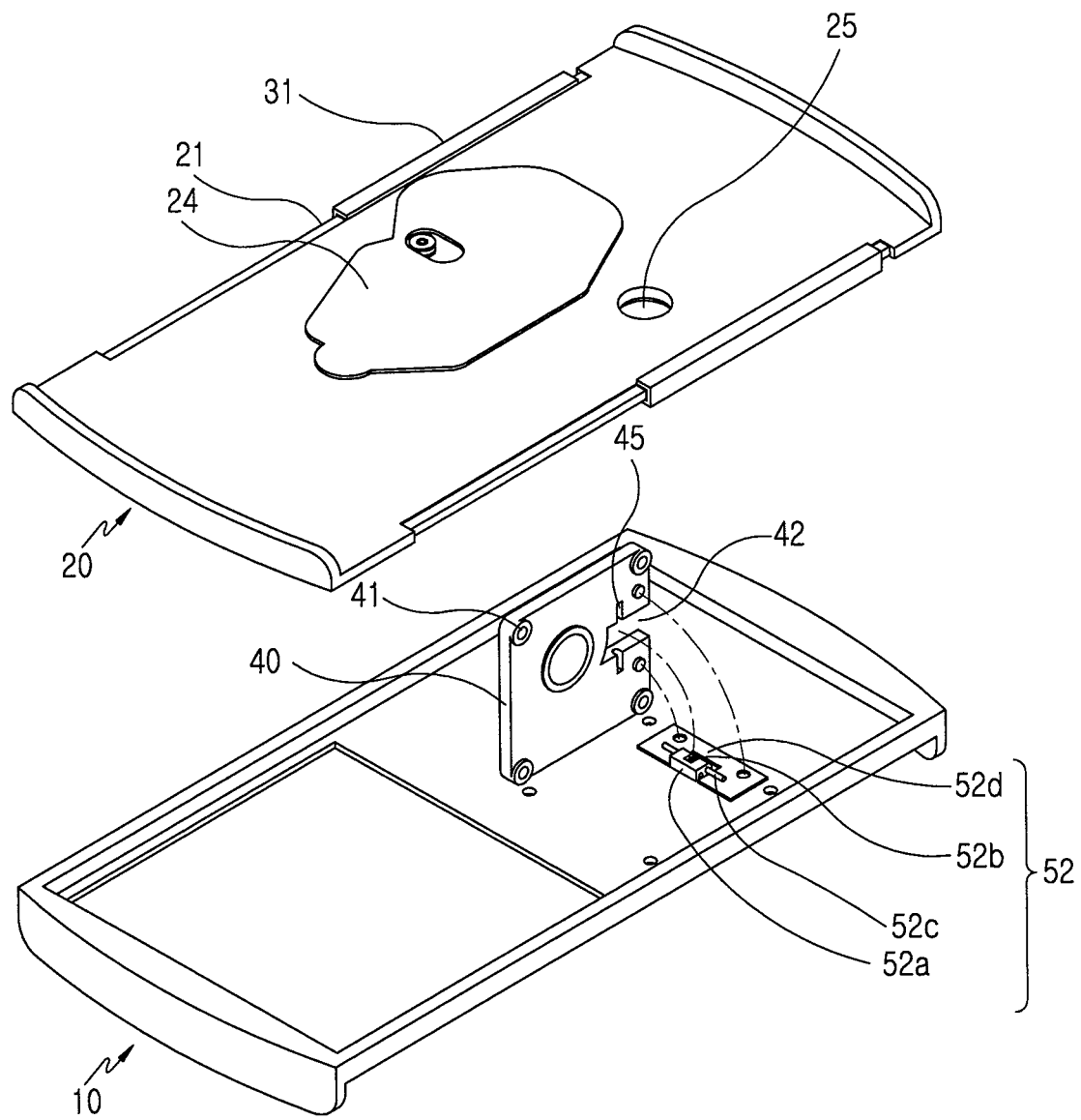
FIG. 4 is an exploded perspective view illustrating a locking device for a sliding/swing type mobile terminal according to an exemplary embodiment of the present invention, which shows the locking device in a state before being assembled.

As shown in FIGS. 1, 3 and 4, the swing member 40 is eccentrically located with respect to the center of the sliding member 30 so as to place the sliding housing 20 at the center with respect to the body housing 10 when the sliding housing 20 swings about the hinge axis A1 of the swing member 40.

As shown in FIGS. 3 and 4, the swing member 40 has at least one or more connecting unit 41 formed therein to connect itself to the body housing 10. The swing member 40 has a guide section 42 which extends in the sliding direction, which has one end opened and the other end closed, and guides the locker 51.

As shown FIGS. 1, 2, 4, 6, 7, 8, 9 and 10, the locking unit 50 includes the locker 51, a first locking unit 52 and a second locking unit 53. The locker 51 is disposed in the sliding housing 20 so that it is either in contact with or escaped from the first locking unit 52, and swings in the second locking unit 53. The first locking unit 52 is connected with the swing member 40 so as to be disposed corresponding to the locker 51. When the sliding housing 20 slides in a direction away from the body housing 10, the first locking unit 52 is separated from the locker 51 and at the same time turns so as to be inserted into the guide insertion section 33. Therefore, the first locking unit 52 is engaged with the sliding member 30 so as to prevent the sliding housing 20 from swinging. When the sliding housing 20 slides in a direction near to the body housing 10, the first locking unit 52 comes into contact with the locker 51 and is turned so as to escape from the guide insertion section 33 and thus escapes from the engagement with the sliding member 30.

As shown in FIGS. 14, 15, 16, 17 and 18, the second locking unit 53 is disposed around the hinge axis A1 of the swing member 40. The second locking unit 53 is disposed in the swing member 40 in such a manner that when the sliding housing 20 swings while the locker 51 and the first locking unit 52 are in contact with each other, the locker 51 together with the sliding member 30 rotates about the hinge axis A1 and moves while being guided, so that it prevents the sliding housing 20 from sliding.

As shown in FIGS. 2, 4, 9, 10, 11, 12 and 13, the first locking unit 52 includes a turning locker 52a, an elastic member 52b, a locker hinge unit 52c and a support member 52d. The turning locker 52a is disposed in the swing member 40 so that it turns when coming in contact with the locker 51.

The elastic member 52b is disposed in the turning locker 52a, so that it provides an elastic force to turn the turning locker 52a. The locker hinge unit 52c is disposed in the turning locker 52a, so that it provides a turning axis B1 and is rotatably connected to rotation recesses 45 formed in the swing member 40. The support member 52d is connected to the swing member 40, so that it supports a turning of the turning locker 52a.

As shown in FIGS. 2, 15, 16, 17 and 18, the second locking unit 53 is a guide groove of a predetermined depth. The guide groove includes one end 53a having an engaging recess where an engaging protrusion 34 formed in the sliding member 30 is inserted therein and escaped therefrom. The guide groove also includes the other end 53b having a locker contact portion which comes into contact with the locker 51 so that it prevents the sliding member 30 from sliding. The engaging protrusion 34a has a guide inclined plane 34a formed therein, which comes into contact with the turning locker 52a and guides the turning locker 52a to turn.

As shown in FIGS. 1, 2, 15, 16, 17 and 18, there is formed a stopper unit 60 between the sliding member 30 and the swing member 40, which prevents the sliding member 30 from swinging. The stopper unit 60 includes a stopper washer 61, at least one or more stopper recesses 62 and a wave washer 63. The stopper washer 61 is disposed in the swing member 40 so that the stopper washer 61 moves upward and downward with respect to the hinge axis A1 when the sliding member 30 swings while the stopper washer 61 is in facing contact with the sliding member 30. The stopper recesses 62 are disposed on the stopper washer 61 around the hinge axis A1 at equiangular intervals so that they engage with and release stopper protrusions 64 formed in the sliding member 30. The wave washer 63 is disposed under the stopper washer 61 so that it provides an elastic force enabling the stopper washer 61 to move upward and downward to be in close contact with and escape from the stopper protrusions 64.

As shown in FIGS. 1 and 2, the swing member 40 has a seating recess 43 formed therein, which is connected with the stopper unit 60. The seating recess 43 has at least one or more securing recesses 44 formed on a circumference thereof so that the securing recesses 44 are each engaged with each of securing protrusions 61a formed in the stopper washer 61.

Figure 12:
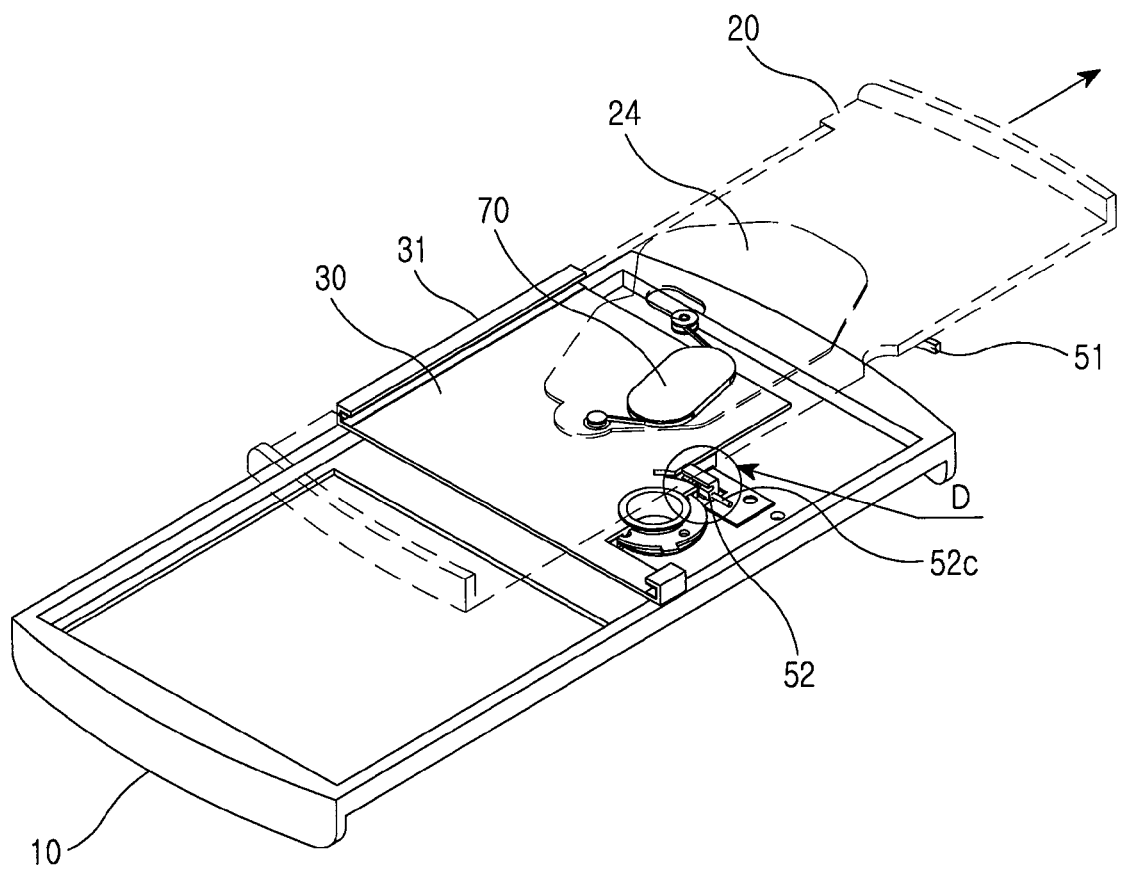
FIG. 12 is a partially cut perspective view illustrating a locking device for a sliding/swing type mobile terminal according to an exemplary embodiment of the present invention, which shows the locking device in a state after sliding.

As shown in FIGS. 1 and 12, there is disposed an elastic unit 70 between the sliding housing 20 and the sliding member 30, so that it provides an elastic force enabling the sliding housing 20 to slide when sliding. The elastic unit 70 has one end 71 connected to the sliding housing 20 and the other end 72 connected to the sliding member 30, so that the elastic unit 70 rotates in a predetermined trace. The sliding housing 20 has a rotation space 24 formed therein, thereby allowing the elastic unit 70 to rotate in the predetermined trace. The sliding housing 20 also has a flexible circuit hole 25 formed therein, through which a flexible circuit passes to electrically connect the sliding housing 20 with the body housing 10.

As shown in FIGS. 1 and 2, the locking unit 50 includes a bush ring 80 connecting the sliding member 30, the swing member 40 and the stopper unit 60 sequentially.

Hereinafter, there will be explained an operation of the locking device for sliding/swing type mobile terminal according to an exemplary embodiment of the present invention with reference to FIGS. 1 to 18 in more detailed.

As shown in FIGS. 1 and 2, the sliding/swing type mobile terminal includes the body housing 10, the sliding housing 20, the sliding member 30, the swing member 40 and the locking unit 50. The guide ribs 31 of the sliding member 30 are slidably connected with the guide rails 21 formed in the sliding housing 20.

At this time as shown in FIGS. 1 and 5, the elastic unit 70 is disposed between the sliding member 30 and the sliding housing 20, which provides the elastic force enabling the sliding housing 20 to slide. The elastic unit 70 is connected at one end 71 to the hole formed in the sliding housing 20 and at the other end 72 to the sliding member 30, respectively. The elastic unit 70 is located in the rotation space 24 formed in the sliding housing 20.

As shown in FIG. 2, the wave washer 63 is seated in the seating recess 43, and the stopper washer 61 is disposed over the wave washer 63. The securing protrusions 61a formed in the stopper washer 61 are inserted into the securing recesses 44 formed in the seating recess 43, so that the stopper washer 61 is seated in the seating recess 43.

In this state, as shown in FIG. 2, the bush ring 80 is disposed through the swing member 40, the wave washer 63, the stopper washer 61, and the connecting hole 32 of the sliding member 30 so as to connect them. The locker hinge unit 52c of the first locking unit 52 is inserted into the rotation recesses 45, and in this state the support member 52d is connected to the swing member 40 so as to support the locker hinge unit 52c. The turning locker 52a is disposed in the locker hinge unit 52c.

In this state, as shown in FIGS. 4, 7, 8, 9 and 10, the swing member 40 is connected to the body housing 10 through the connecting unit 41. Then, the locker 51 disposed in the sliding housing 20 comes into contact with the turning locker 52a, and then turns and press the turning locker 52a.

In this state, as shown in FIGS. 6, 11, 12 and 13, if the user slides the sliding housing 20 in the direction away from the body housing 10, the guide rails 21 are slid together with the sliding housing 20 while being guided by the guide ribs 31 disposed in the sliding member 30.

Figure 13:
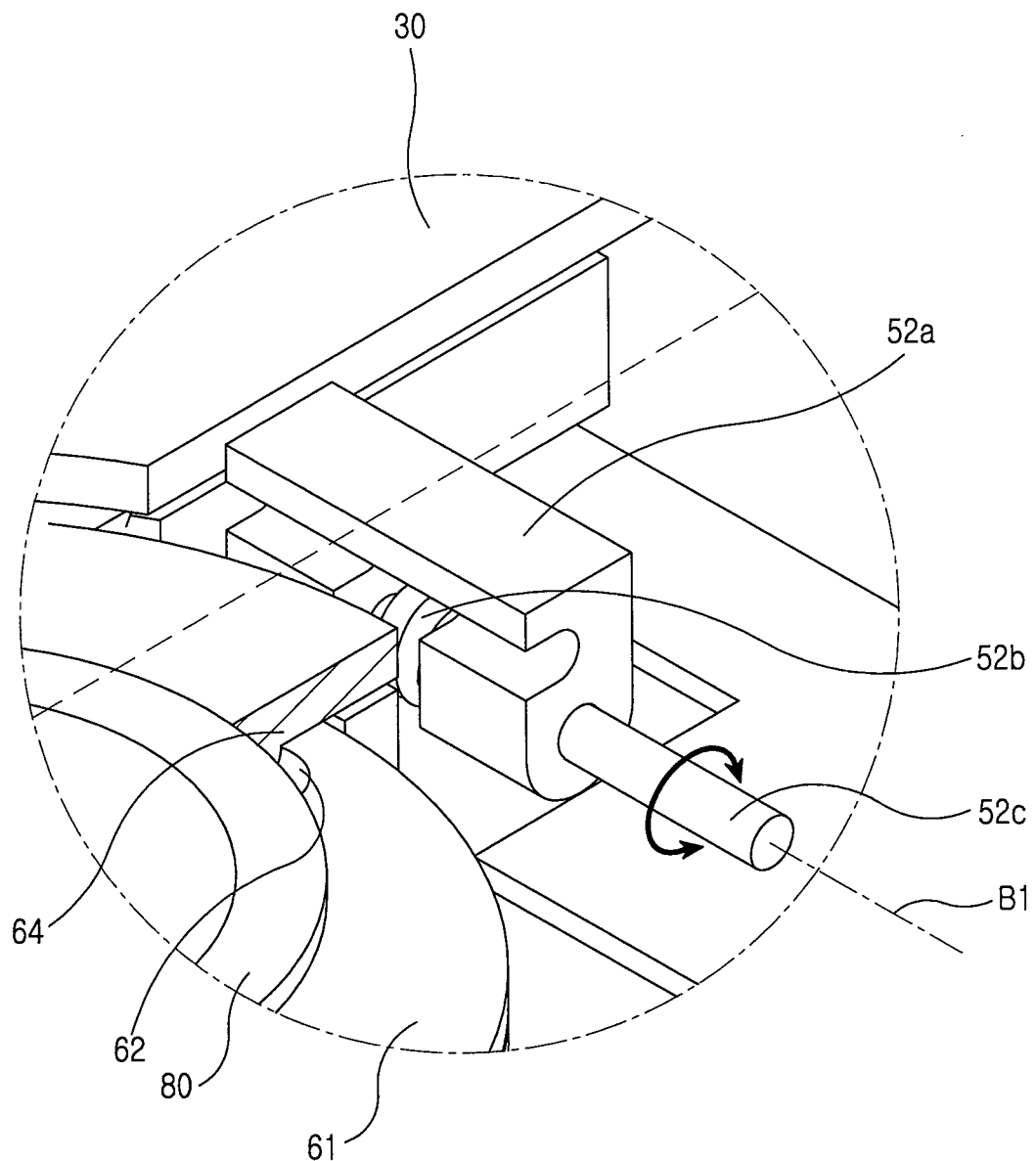
FIG. 13 is an enlarged perspective view of "D" of FIG. 12.

At this time as shown in FIG. 13, the locker 51 of the locking unit 50 slides together with them. The locking unit 50 includes the first and second locking units 52 and 53. The first locking unit 52 includes the turning locker 52a, the elastic member 52b, the locker hinge unit 52c and the support member 52d. The second locking unit 53 includes the guide groove 53.

Figure 9:
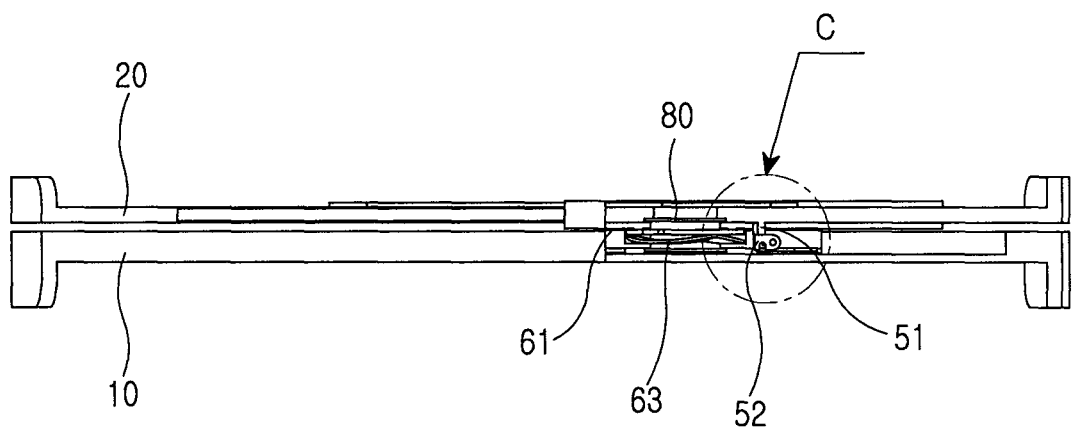
FIG. 9 is a side sectional view illustrating a locking device for a sliding/swing type mobile terminal according to an exemplary embodiment of the present invention, which shows the locking device in a state before sliding.
Figure 10:
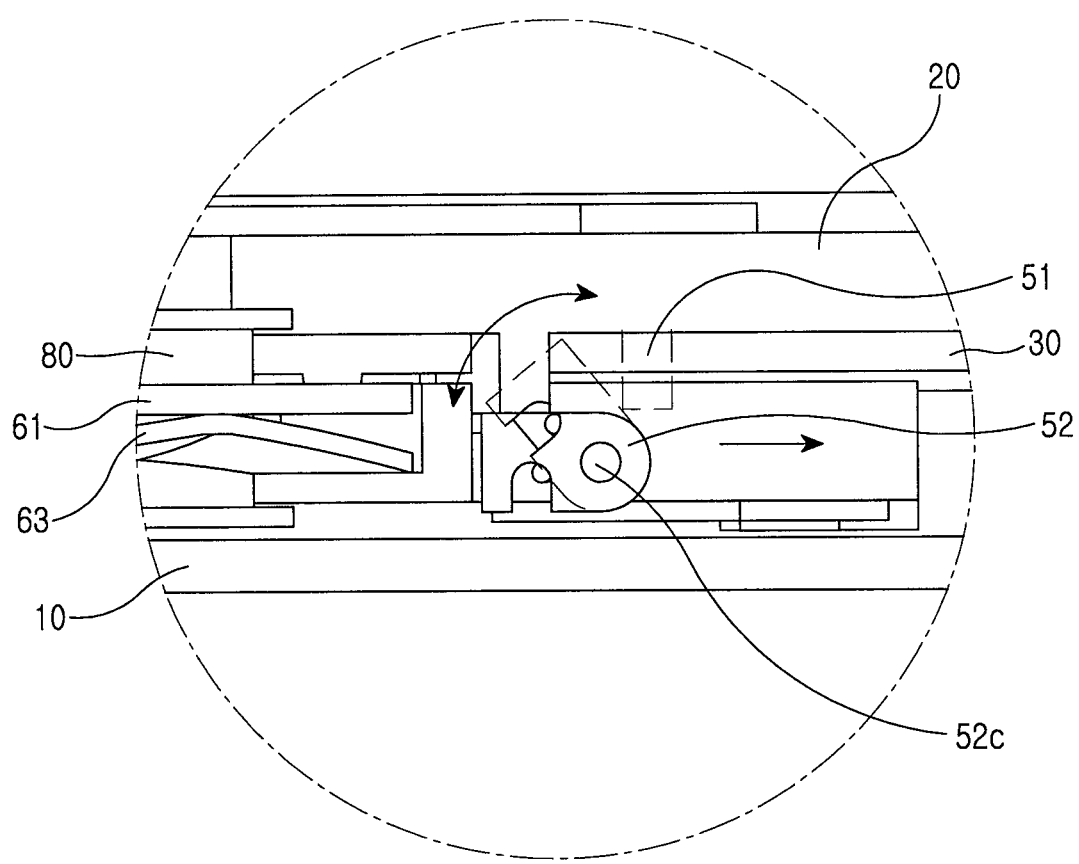
FIG. 10 is an enlarged side sectional view of "C" of FIG. 9.
Figure 11:
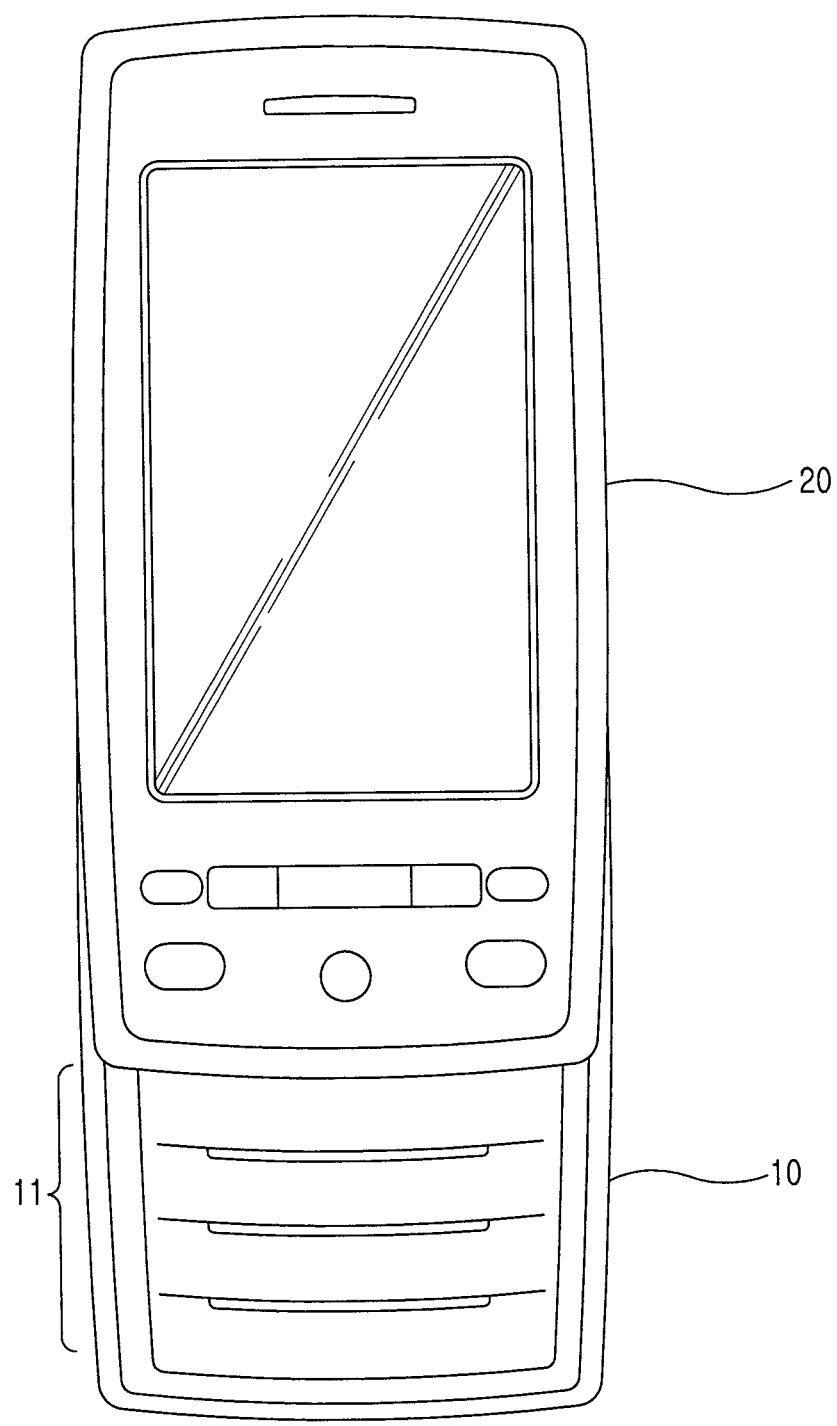
FIG. 11 is a plan view illustrating a sliding/swing type mobile terminal employing a locking device according to an exemplary embodiment of the present invention, which shows the terminal in a state after a sliding movement.

As shown in FIGS. 9 and 10, the locker 51 escapes from the turning locker 52a of the first locking unit 52 and then moves through the guide insertion section 33 of the sliding member 30 and the guide section 42 of the swing member 40 while being guided by them.

At this time as shown in FIGS. 12 and 13, the turning locker 52a turns about the turning axis B1 of the locker hinge unit 52c while at the same time the locker 51 moves. Since the turning locker 52a has the elastic member 52b enabling the turning locker 52a to turn, the turning locker 52a starts turning about the turning axis B1 while the locker 51 starts escaping from the turning locker 52a. At this time, the turning locker 52a is inserted into and engaged with the guide insertion section 33 so as to prevent the sliding member 30 from swinging.

Figure 6:
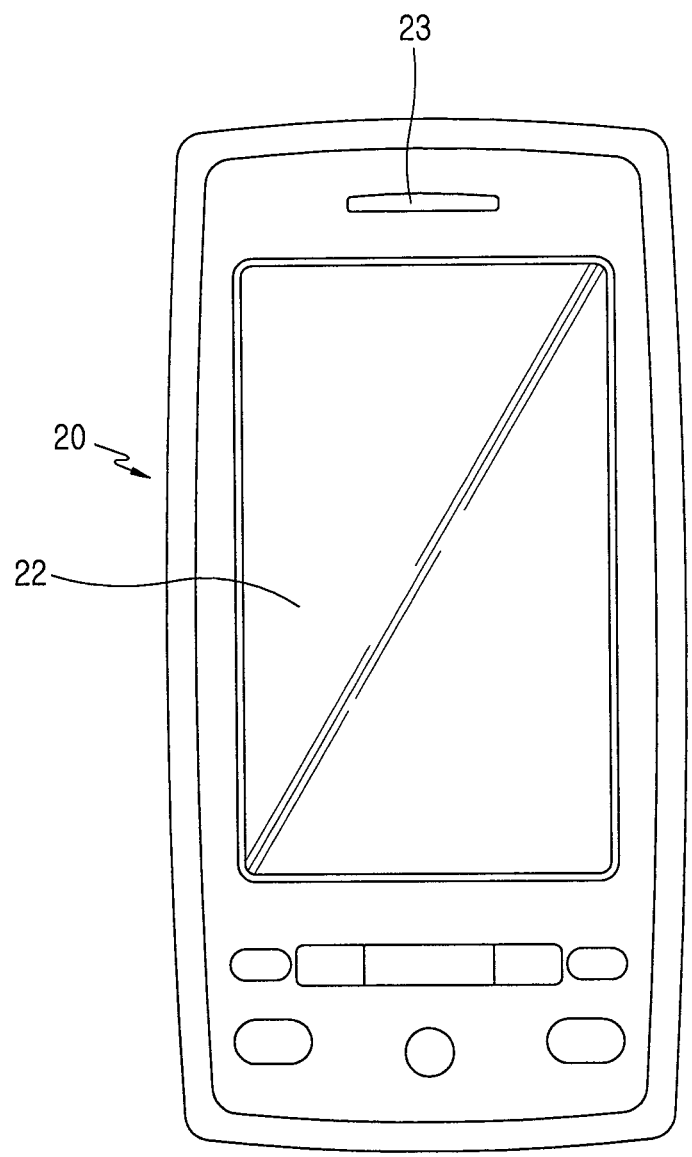
FIG. 6 is a plan view illustrating a sliding/swing type mobile terminal employing a locking device according to an exemplary embodiment of the present invention, which shows the mobile terminal in a state before a sliding movement.
Figure 7:
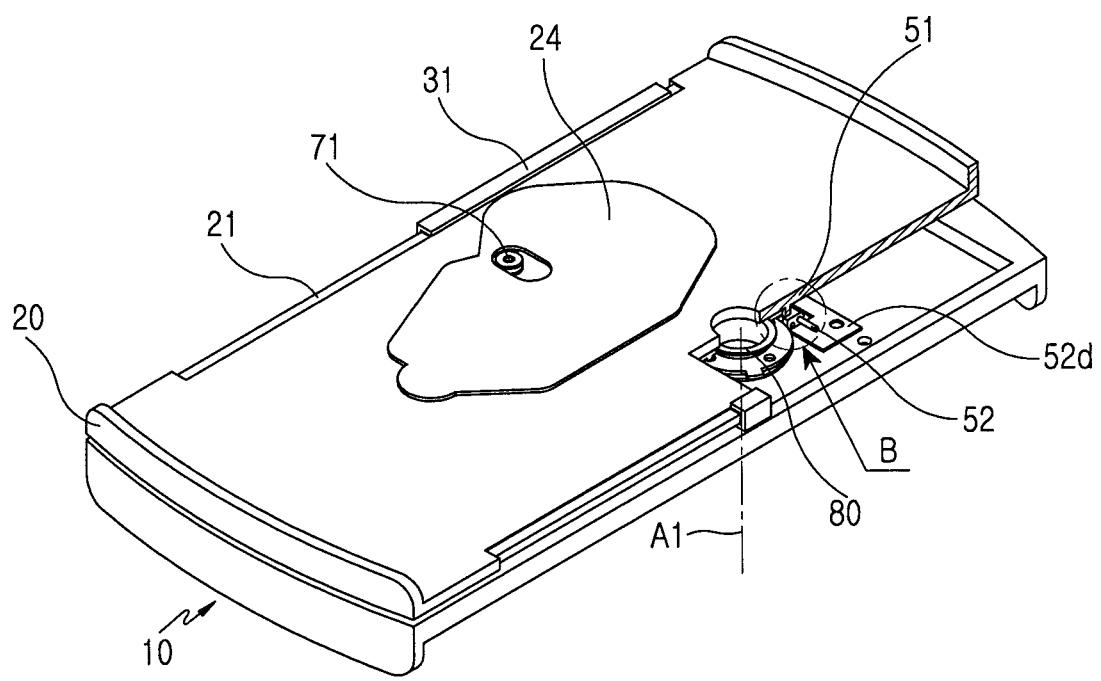
FIG. 7 is an exploded perspective view illustrating a locking device for a sliding/swing type mobile terminal according to an exemplary embodiment of the present invention, which shows the locking device in a state before a sliding movement.
Figure 8:
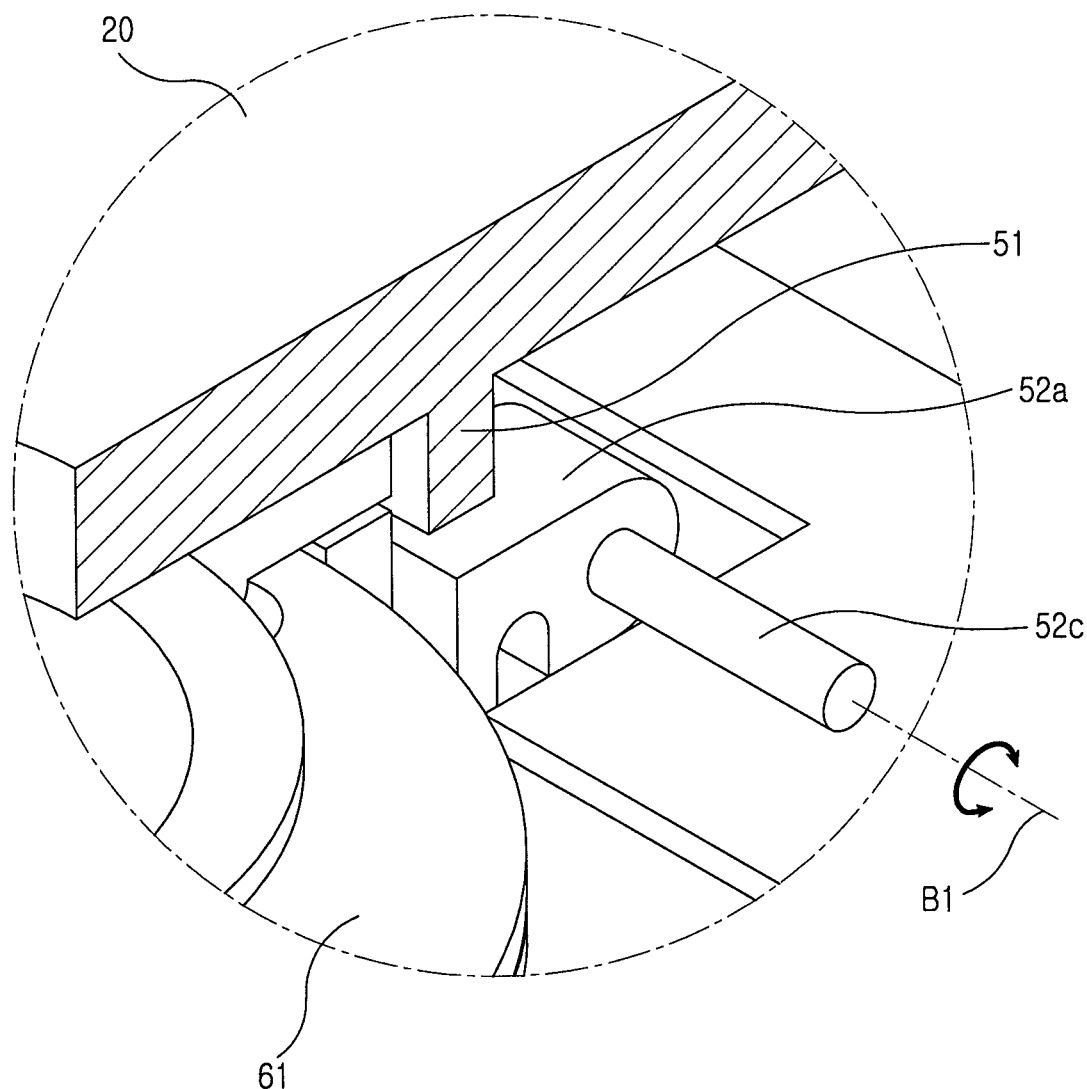
FIG. 8 is an enlarged exploded perspective view of "B" of FIG. 7.

In this state, as shown in FIGS. 6, 9 and 10, if the user slides the sliding housing 20 in the direction near to the body housing 10, the locker 51 slides together with the sliding housing 20 and thus the locker moves into the entrance of the guide insertion section 33 while being guided. When the locker 51 reaches a movement finishing position of the guide insertion section 33, it comes into contact with the turning locker 52a, and thus turns the turning locker 52a and, at the same time, escapes from the guide insertion section 33 to escape from the engagement with the guide insertion section 33.

Figure 14:
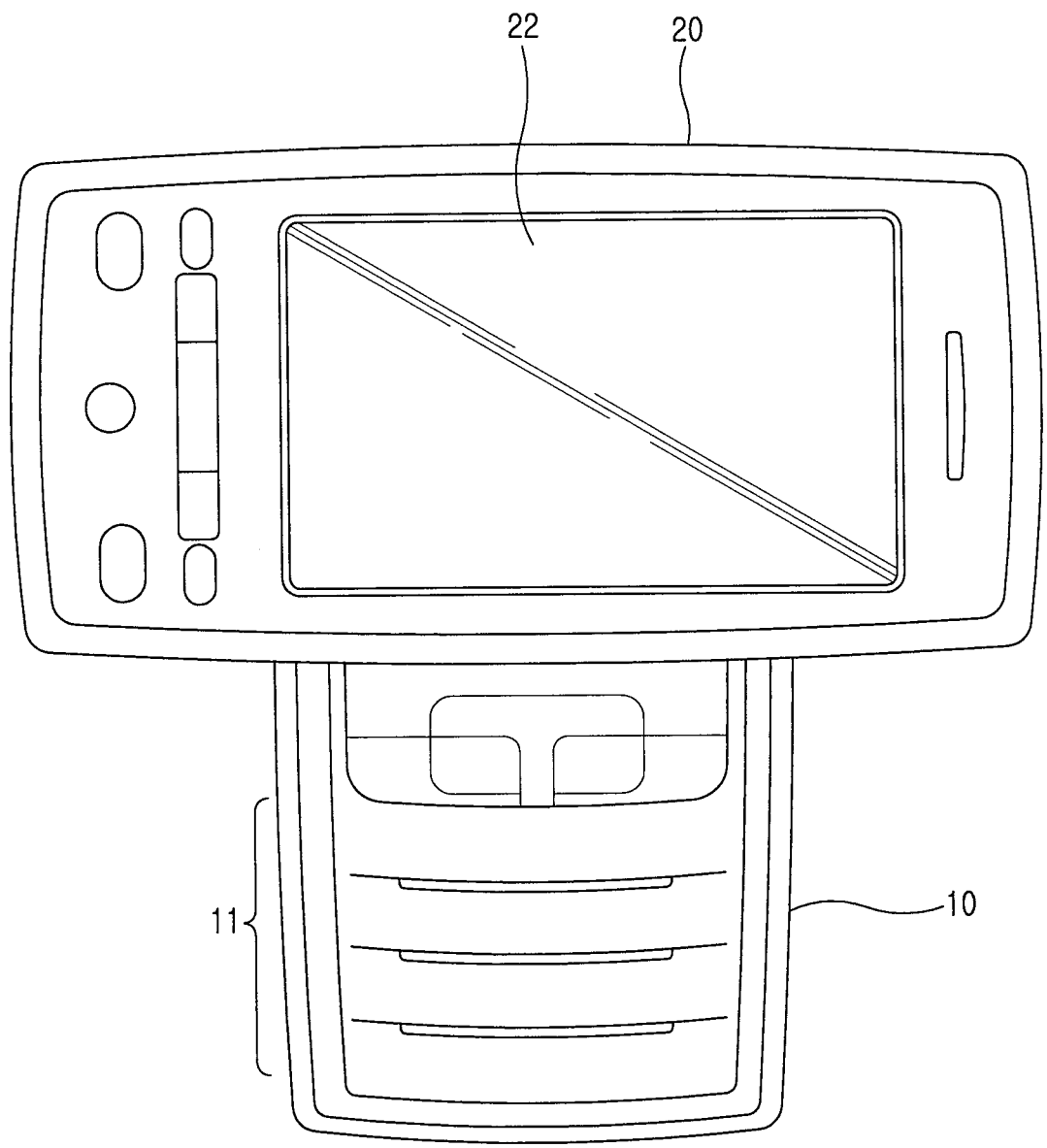
FIG. 14 is a plan view illustrating a sliding/swing type mobile terminal employing a locking device according to an exemplary embodiment of the present invention, which shows the terminal in a state after a swing movement.

In this state, as shown in FIG. 14, if the sliding housing 20 is swung, the locker 51 rotatably moves along the guide groove 53. The locker 51 prevents the sliding housing 20 from sliding when the locker 51 rotatably moves along the guide groove 53.

Figure 15:
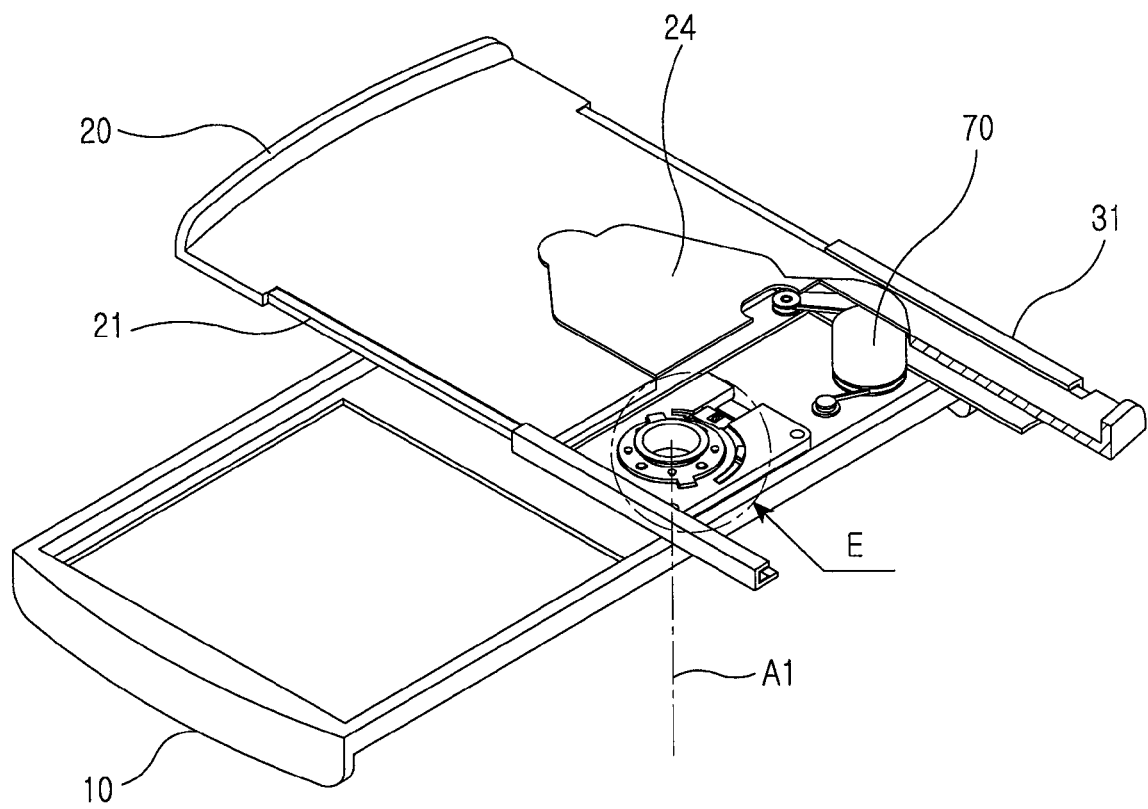
FIG. 15 is a partially cut perspective view illustrating a locking device for a sliding/swing type mobile terminal according to an exemplary embodiment of the present invention, which shows the locking device in a state after swinging.
Figure 16:
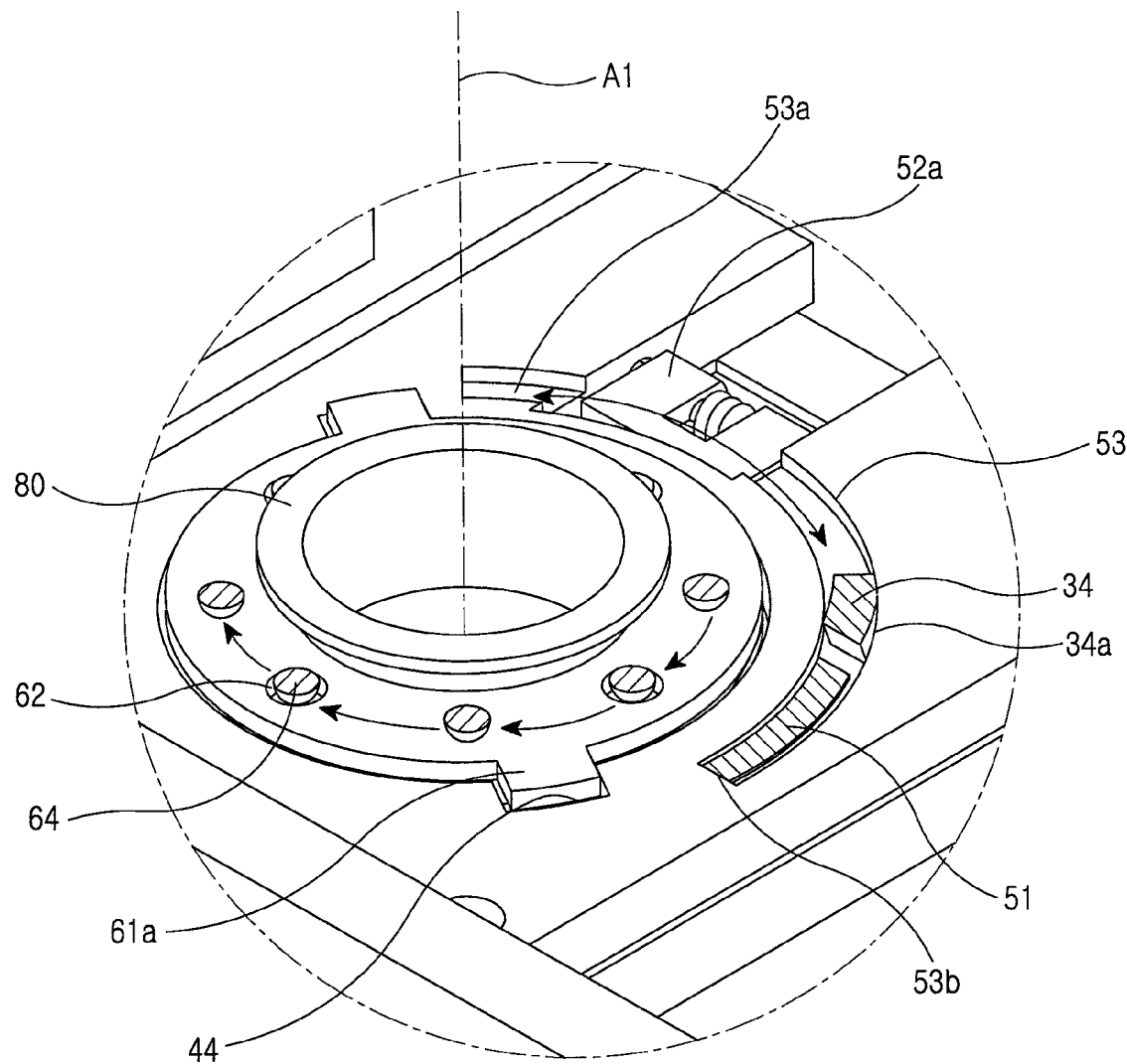
FIG. 16 is an enlarged perspective view of "E" of FIG. 15.

As shown FIGS. 15 and 16, the locker 51 escapes from the turning locker 52a and rotates, and then comes into contact with the locker contact portion 53b to prevent the sliding housing 20 from swinging. At this time, the sliding member 30 and the stopper protrusions 64 of the sliding member 30 are swung together with the sliding housing 20.

As shown in FIG. 16, the stopper washer 61 of the stopper unit 60 has at least one or more stopper recesses 62 formed therein at equiangular intervals. Therefore, when the stopper protrusions 64 have escaped from the stopper recesses 62, each of the stopper protrusions 64 is inserted into a next one of the stopper recesses 62 so as to restrict the sliding member 30 from swinging.

At this time, the stopper washer 61 moves upward and downward with respect to the hinge axis A1 so as to be in close contact with and escape from the stopper protrusions 64.

The wave washer 63 is disposed under the stopper washer 61, thereby providing the elastic force to enable the stopper washer 61 to move upward and downward.

At this time, the sliding member 30 swings at an angle of approximately 90°.

Figure 17:
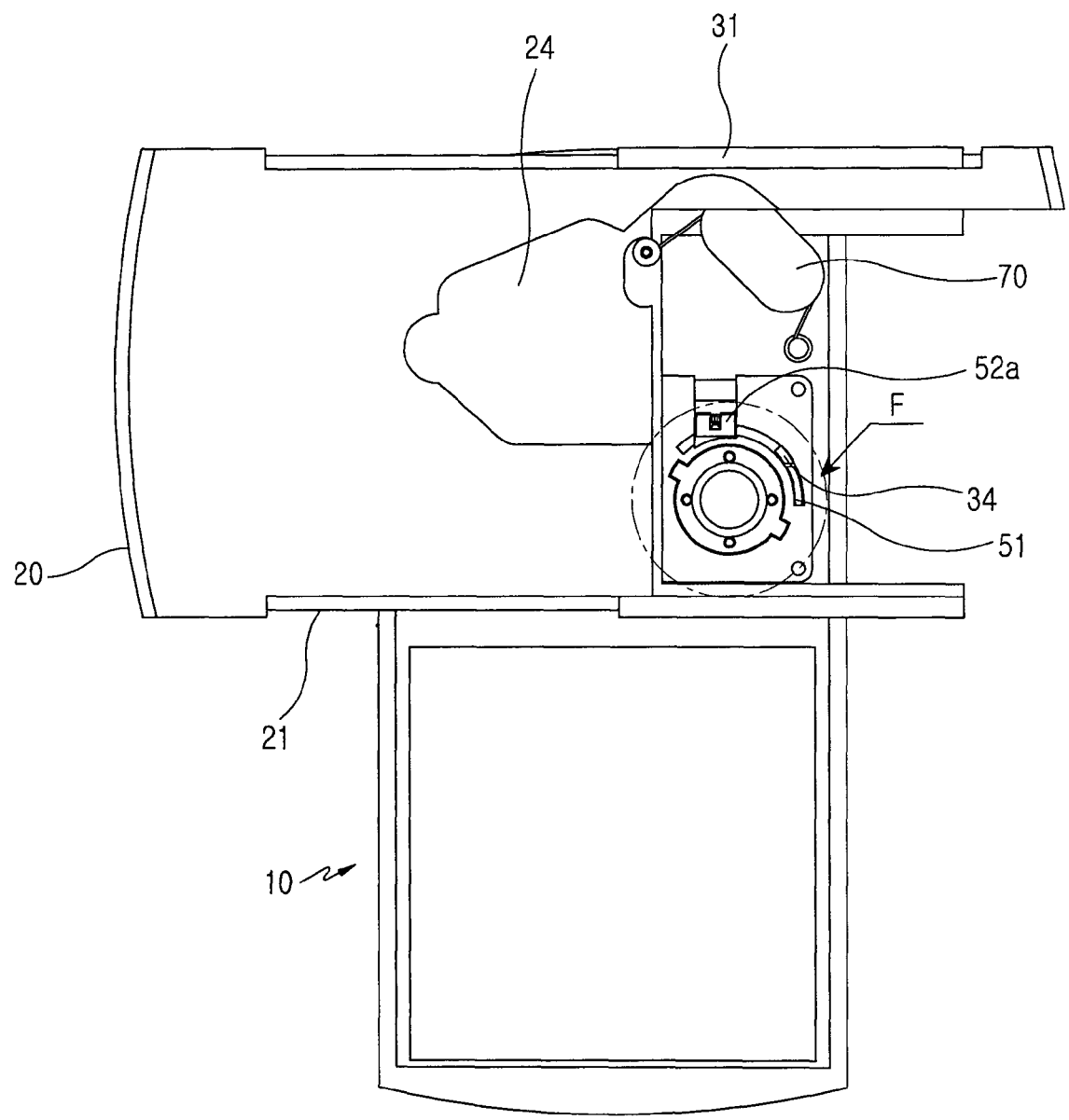
FIG. 17 is a partially cut plan view illustrating a locking device for a sliding/swing type mobile terminal, which shows the locking device in a state after swinging.

As shown in FIGS. 14 and 17, the swing member 40 is eccentrically disposed from the center of the sliding member 30. If the sliding housing 20 is swung about the hinge axis A1, the sliding housing 20 is positioned at the center with respect to the body housing 10.

At this time, the body housing 10 and the sliding housing are, as shown in FIG. 14, a "T" shape.

Figure 18:
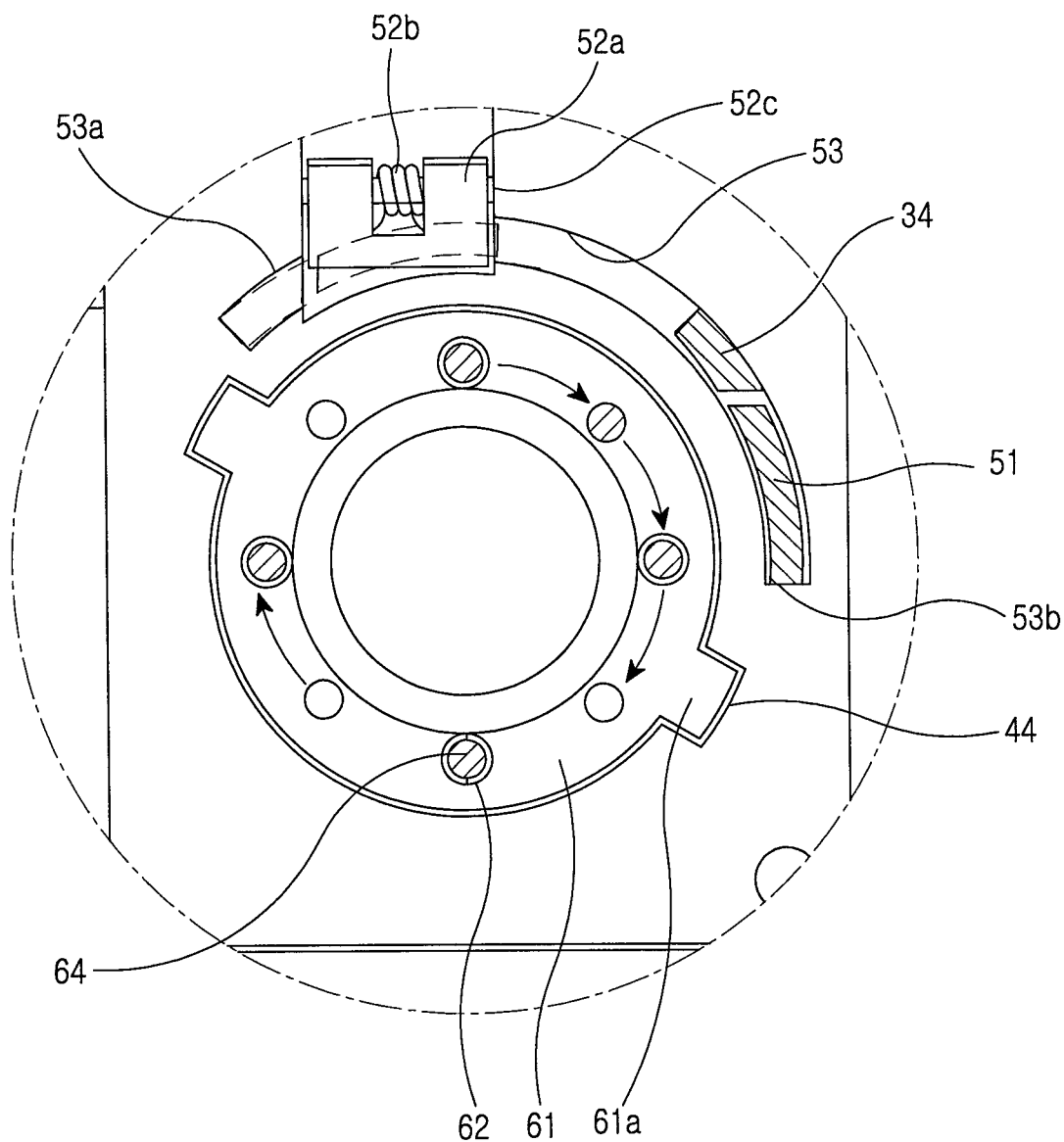
FIG. 18 is an enlarged perspective view of "F" of FIG. 17.

In this state, as shown in FIGS. 17 and 18, if the user swings the sliding housing 20 to face the body housing 10 again, the locker 51 and the engaging protrusion 34 are rotatably moved together, and the engaging protrusion 34 then goes beyond the turning locker 52a so as to be inserted into the engaging recess 53a, by which the swing of the sliding member 30 is prevented.

The engaging protrusion 34 has the guide inclined plane 34a formed therein, which guides the engaging protrusion 34 in a manner permitting it to be in contact with and go over the turning locker 52a and then continue to move rotatably.

At this time, the locker 51 comes into contact with and presses the turning locker 52a again.

As described above, the swing movement of the sliding housing is restrained when sliding and the sliding movement of the sliding housing is restrained when swinging, thereby making the sliding/swing movement easy and providing improved functions of the sliding or swing locking of the terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A locking device for a sliding/swing mobile terminal, which includes a body housing and a sliding housing, the sliding housing sliding on the body housing and swinging to open and close, the locking device comprising:
   a sliding member which is connected to the sliding housing while enabling the sliding housing to slide;
   a swing member coupled to the sliding member while enabling the sliding member to swing; and
   a locking unit which includes the sliding member and the swing member and prevents the sliding housing from swinging while the sliding housing is in its original position and slides linearly away from the body housing and prevents, when the sliding housing is in the original position, the sliding housing from sliding while swinging in a state before sliding linearly away from the body housing,
   wherein the original position comprises an upper surface of the body housing being fully covered by the sliding housing,
   wherein the locking unit comprises a locker, a first locking unit and a second locking unit, the second locking unit comprising a guide groove having a depth,
   wherein the guide groove includes one end having an engaging recess which an engaging protrusion is inserted into or escaped from and another end having a locker contact portion to be in contact with the locker so as to prevent the sliding member from sliding, and
   wherein the engaging protrusion comprises a guide inclined plane formed therein, the guide inclined plane guiding the engaging protrusion to rotatably move when being in contact with a turning locker of the first locking unit.

2. The locking device as claimed in claim 1, wherein the sliding member comprises:
   a pair of guide ribs each of which is respectively formed on each of both sides of the sliding member and is movably connected with each of guide rails formed on the sliding housing for guiding each of the guide rails;
   a connecting hole which is formed on the sliding member and is eccentrically disposed from a center of the sliding member; and
   a guide insertion section which is formed adjacent to the connecting hole in a sliding direction for receives and guides a locker formed in the sliding housing.

3. The locking device as claimed in claim 2, wherein each of the guide ribs further comprises each of friction reducing members which is disposed therein and reduces friction when the guide rails slide.

4. The locking device as claimed in claim 2, wherein the guide insertion section has one end opened to form an entrance through which the locker is inserted therein and escaped therefrom and the other end closed to restrict a movement of the locker.

5. The locking device as claimed in claim 1, wherein the swing member is eccentrically disposed from a center of the sliding member and places the center of the sliding housing on an upper portion of the body housing when the sliding housing swings about a hinge axis of the swing member.

6. The locking device as claimed in claim 2, wherein the swing member comprises:
   at least one or more connecting units connected to the body housing; and
   a guide section which is formed in the sliding direction and has one end opened and the other end closed for guiding the locker.

7. The locking device as claimed in claim 1, wherein the locker is formed in the sliding housing,
   wherein the first locking unit is connected to the swing member and disposed corresponding to the locker and turns to be inserted into or escaped from a guide insertion section according to whether to be in contact with or escaped from the locker when the sliding housing slides, so that the first locking unit prevents the sliding housing from swinging or releases the sliding housing from the prevention, and wherein the second locking unit is formed around a hinge axis of the swing member, and, when the sliding housing swings in a state that the locker and the first locking unit are in contact with each other, the locker rotates together with the sliding member and moves while being guided so that the second locking unit prevents the sliding housing from sliding.

8. The locking device as claimed in claim 7, wherein the first locking unit comprises:
   the turning locker which turns by being in contact with the locker;
   an elastic member disposed in the turning locker so as to provide an elastic force turning the turning locker;
   a locker hinge unit which is disposed in the turning locker so as to provide a turning axis and is rotatably connected to rotation recesses; and
   a support member connected to the swing member so as to support a turning of the turning locker.

9. The locking device as claimed in claim 1, further comprising a stopper unit formed between the sliding member and the swing member, wherein the stopper unit prevents the sliding member from swinging.

10. The locking device as claimed in claim 9, wherein the stopper unit comprises:
    a stopper washer for moving upward and downward with respect to the hinge axis of the sliding member while being in facing contact with the sliding member when the sliding member swings;
    at least one or more stopper recesses formed in the stopper washer so as to be disposed around the hinge axis at equiangular intervals, wherein the stopper recesses engages with and releases stopper protrusions formed in the sliding member; and
    a wave washer disposed under the stopper washer, wherein the wave washer allows the stopper washer to move upward and downward and provides an elastic force to enable the recesses to engage with and release the stopper protrusions.

11. The locking device as claimed in claim 9, wherein the swing member comprises a seating recess connected with the stopper unit,
    wherein the seating recess has at least one or more securing recesses formed along a circumference thereof, the securing recesses each engaging with each of securing protrusions.

12. The locking device as claimed in claim 1, further comprising an elastic unit disposed between the sliding housing and the sliding member,
    wherein the elastic unit provides an elastic force to enable the sliding housing to slide when sliding,
    wherein the elastic unit has one end connected to the sliding housing and the other end connected to the sliding member so that the sliding housing rotates along a predetermined trace when sliding.

13. The locking device as claimed in claim 12, wherein the sliding housing further comprises:
    a rotation space allowing the elastic unit to rotate along the predetermined trace; and
    a flexible circuit hole through which a flexible circuit passes to electrically connect the sliding housing with the body housing.

14. The locking device as claimed in claim 9, wherein the locking unit further comprises a bush ring connecting the sliding member, the swing member and the stopper unit sequentially.

15. A locking device for a sliding/swing mobile terminal, which includes a body housing and a sliding housing, the sliding housing sliding on the body housing and swinging to open and close, the locking device comprising:
    a locking unit that prevents the sliding housing from swinging when sliding linearly and prevents, when the sliding housing is in its original position, the sliding housing from sliding when swinging before sliding linearly away from the body housing,
    wherein the original position comprises an upper surface of the body housing being fully covered by the sliding housing,
    wherein the locking unit comprises a locker, a first locking unit and a second locking unit, the second locking unit comprising a guide groove having a depth,
    wherein the guide groove includes one end having an engaging recess which an engaging protrusion is inserted into or escaped from and another other end having a locker contact portion to be in contact with the locker so as to prevent the sliding member from sliding, and
    wherein the engaging protrusion comprises a guide inclined plane formed therein, the guide inclined plane guiding the engaging protrusion to rotatably move when being in contact with a turning locker of the first locking unit.

16. A portable terminal having a locking device for a sliding/swing unit, the portable terminal comprising:
    a body housing;
    a sliding housing which slides on the body housing and swings to open and close;
    a sliding member connected to the sliding housing while enabling the sliding housing to slide;
    a swing member coupled to the sliding member while enabling the sliding member to swing; and
    a locking unit for preventing the sliding housing from swinging while sliding linearly and from sliding, when the sliding housing is in its original position, while swinging in a state before sliding linearly away from the body housing,
    wherein the original position comprises an upper surface of the body housing being fully covered by the sliding housing,
    wherein the locking unit comprises a locker, a first locking unit and a second locking unit, the second locking unit comprising a guide groove having a depth,
    wherein the guide groove includes one end having an engaging recess which an engaging protrusion is inserted into or escaped from and another other end having a locker contact portion to be in contact with the locker so as to prevent the sliding member from sliding, and
    wherein the engaging protrusion comprises a guide inclined plane formed therein, the guide inclined plane guiding the engaging protrusion to rotatably move when being in contact with a turning locker of the first locking unit.

17. The portable terminal as claimed in claim 16, further comprising a stopper unit, which is formed between the sliding member and the swing member and prevents the sliding member from swinging.

18. The portable terminal as claimed in claim 16, further comprising an elastic unit which is disposed between the sliding housing and the sliding member and provides an elastic force to enable the sliding housing to slides when sliding,
    wherein the elastic unit has one end connected to the sliding housing and the other end connected to the sliding member so that the sliding housing rotates along a predetermined trace when sliding.

\* \* \* \* \*